US005731381A

United States Patent [19]

Apecetche et al.

[11] Patent Number: 5,731,381
[45] Date of Patent: Mar. 24, 1998

[54] TERMINATION OF GAS PHASE POLYMERIZATIONS OF CONJUGATED DIENES, VINYL-SUBSTITUTED AROMATIC COMPOUNDS AND MIXTURES THEREOF

[75] Inventors: Maria Angelica Apecetche, Piscataway; Kevin Joseph Cann, Rocky Hill, both of N.J.

[73] Assignee: Union Carbide Chemicals & Plastics Technology Corporation, Danbury, Conn.

[21] Appl. No.: 742,030

[22] Filed: Nov. 1, 1996

[51] Int. Cl.⁶ .................................................. C08F 2/42
[52] U.S. Cl. ................................................. 526/83; 526/84
[58] Field of Search ............................... 526/83, 84

[56] References Cited

U.S. PATENT DOCUMENTS

| | | | |
|---|---|---|---|
| 5,066,736 | 11/1991 | Dumain et al. | 526/82 |
| 5,336,738 | 8/1994 | Havas et al. | 526/82 |
| 5,474,961 | 12/1995 | Schlund et al. | 502/103 |

FOREIGN PATENT DOCUMENTS

| | | |
|---|---|---|
| 0174863 | 3/1986 | European Pat. Off. . |
| 0359444 | 3/1990 | European Pat. Off. . |
| 4 130352A1 | 3/1993 | Germany . |
| WO 9214766 | 9/1992 | WIPO . |

OTHER PUBLICATIONS

Tait, et al., The effect of 14CO contact times on active centre determinations for the polymerization of ethylene catalysed by bis(n–cyclopentadienyl)zirconium (IV) dichloride/methyl–aluminoxane, 1987, pp. 393–398.

*Primary Examiner*—Thomas R. Weber
*Attorney, Agent, or Firm*—B. L. Deppenbrock

[57] ABSTRACT

There is provided a method for terminating a gas phase polymerization of a compound selected from the group consisting of a conjugated diene, a vinyl-substituted aromatic compound, and mixtures thereof, in a polymerization vessel in the presence of a catalyst, and optionally in the presence of an inert particulate material, comprising introducing a kill agent selected from the group consisting of an alcohol having 1 to 20 carbon atoms, an alkyl or cycloalkyl monoether, ammonia, water, an alkyl or aryl amine, and mixtures thereof.

9 Claims, No Drawings

TERMINATION OF GAS PHASE POLYMERIZATIONS OF CONJUGATED DIENES, VINYL-SUBSTITUTED AROMATIC COMPOUNDS AND MIXTURES THEREOF

FIELD OF THE INVENTION

The present invention relates to a method for terminating gas phase polymerizations of conjugated dienes, vinyl-substituted aromatic compounds, and mixtures. More particularly, the invention relates to the termination of such processes using a kill agent selected from the group consisting of an alcohol having 1 to 20 carbon atoms, a alkyl or cycloalkyl monoether having 2 to 20 carbon atoms, ammonia, water, an alkyl or aryl amine, and mixtures thereof.

BACKGROUND OF THE INVENTION

It has recently been discovered that polybutadiene, polyisoprene, polystyrene, and styrene-butadiene polymers can be polymerized in a fluidized gas phase reactor in the presence of a transition metal catalyst (including metallocenes) and/or a rare earth metal catalyst.

Accordingly, there is a need for an effective process for completely or practically completely stopping such polymerizations. It has further been found that deactivating agents or kill agents useful in alpha olefin polymerizations (e.g., CO, $CO_2$, and the like) are not effective to terminate polymerizations employing butadiene, isoprene, styrene, and mixtures of them.

Surprisingly, it has been discovered that the process of the present invention enables a gas phase polymerization of, for example, butadiene, isoprene, styrene, or styrene and butadiene to be stopped without being obliged to remove the reaction gas mixture from the polymerization reactor system. However, before restarting the polymerization reaction, the reaction mixture may have to be purged in order to remove from the reactor any remaining kill agent. Also, the process according to the present invention allows the polymerization reaction to be restarted without draining the bed, simply by feeding the reactor again with fresh diene monomer and optionally catalyst, cocatalyst, and/or promoter.

SUMMARY OF THE INVENTION

Accordingly, the present invention provides a process for terminating a polymerization of a compound selected from the group consisting of a conjugated diene, a vinyl-substituted aromatic compound, and mixtures thereof comprising introducing a kill agent selected from the group consisting of an alcohol having 1 to 20 carbon atoms, an alkyl or cycloalkyl monoether having 2 to 20 carbon atoms, ammonia, water, an alkyl or aryl amine, and mixtures thereof in an amount effect to terminate the polymerization.

Detailed Description of the Invention

Polymers. The process of the invention is suited for stopping a gas phase polymerization reaction of one or more dienes and/or one or more vinyl-substituted aromatic compounds. Illustrative of the polymers which can be produced in accordance with the invention are the following: polyisoprene; polybutadiene; polystyrene, butadiene copolymerized with styrene; a polymer of acrylonitrile, butadiene, and styrene; a polymer of butadiene and acrylonitrile; a polymer of isobutylene and isoprene; polychloroprene; and a copolymer of ethylene and one or more of acrylonitrile, butadiene, isoprene, styrene, chloroprene, and/or isobutylene.

Typically, these polymers range in Mooney from 20 to 100, have a cis-content ranging from 40 to 100 percent, and have low gels. The polymers produced by the gas phase process described in the present invention are granular and free-flowing and find utility in automotive applications such as weather stripping, hoses, tire components, and ignition cables. They can also be used in wire and cable, construction in materials such as roofing products, hose and tubing, and mechanical applications.

Polymerization. The polymerization can be in solution/slurry, fluidized, stirred, bulk, high pressure, low pressure, or half slurry/half gas phase. For the polymerization process of the invention, the fluidized bed can be a stirred fluidized bed reactor or a fluidized bed reactor which is not stirred. Preferably, the polymerization is conducted in at least one gas phase reactor. When multiple reactors are employed, it is preferred that they be used in series. The present invention is not limited to any specific type of gas phase polymerization reaction. In addition to conventional gas phase polymerization processes, "condensed mode" including the so-called "induced condensed mode" and "liquid monomer" operation of a gas phase polymerization can be employed.

A conventional fluidized bed process for producing resins, such as disclosed in U.S. Pat. Nos. 4,482,687; 4,994,534; 5,304,588; and EP 0 647,657A1 is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor alone with make-up monomer added to the recycle stream.

Condensed mode polymerizations are disclosed in U.S. Pat. Nos. 4,543,399; 4,588,790; 4,994,534; 5,317,036; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduced to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it desirable that the liquid entering the fluidized bed be dispersed and vaporized quickly.

Liquid monomer polymerization mode is disclosed, in U.S. Pat. No. 5,453,471; U.S. Ser. No. 510,375 now pending; PCT 95/0986 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, liquid monomer process are conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter. In the present invention, liquid monomer gas phase polymerization is preferred.

The process can be carried out in a batch, intermittent, or continuous mode, the latter being preferred. The essential parts of the reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Polybutadiene, polyisoprene, and styrene homo- and co-polymers can be produced in the gas phase by use of a transition metal catalyst, including metallocenes, rare earth metal catalyst, or mixtures of them. Such catalysts can be supported or unsupported, in solution and/or slurry, spray dried, or in prepolymer form. However, in this invention, polybutadiene, polyisoprene, and styrene homo- and co-polymers are preferably produced in accordance with the processes and procedures disclosed in WO 96/04323 (PCT/US95/09827) in the presence of a rare earth metal catalyst. Alternatively, these polymers can be produced using the procedures disclosed in WO 96/04322 (PCT/US95/09826) in the presence of a transition metal catalyst (including nickel, cobalt, titanium, and/or a metallocene component). The butadiene (e.g., 1,3-butadiene), isoprene, or styrene is introduced directly into the polymerization zone of the reactor or carried into the polymerization zone as with the recycle gas stream or a combination of both. The temperature within the polymerization zone can be maintained below the condensation temperature of the diene monomer in the zone. Or, in another embodiment, the conditions (e.g., temperature, pressure, concentration of diene monomer) within the polymerization zone are such that essentially no liquid is present in the zone that is not adsorbed on or absorbed in solid particulate matter. Alternatively, the conditions with the polymerization zone are maintained such that a portion of the diene monomer is a liquid that is not adsorbed on or absorbed in the solid particulate matter.

The rare earth metal catalyst employed in the polymerization zone is not limited to any particular class of rare earth metal catalyst. Rare earth catalysts that have been previously employed in slurry, solution, or bulk polymerizations of higher boiling or readily condensable monomers (e.g., butadiene and isoprene) can be utilized in this invention. The rare earth metal catalysts employed in the invention can have a rare earth metal precursor component, a co-catalyst component, and optionally a promoter. The precursor component can be a single compound or a mixture of two or more rare earth metal compounds. The precursor component can be introduced to the polymerization zone in a solution or slurry, on a support (e.g., silica, carbon black, porous crosslinked polystyrene or polypropylene, alumina, or magnesium chloride), spray dried, or as a prepolymer.

Any compound, organic or inorganic, of a metal chosen from those of Group IIIB of the Periodic Table of the Elements having an atomic number of between 57 and 103 can be employed herein. Examples of rare earth metal compounds are compounds of cerium, lanthanum, praseodymium, gadolinium and neodymium. Of these compounds, carboxylates, alcoholates, acetylacetonates, halides (including ether and alcohol complexes of neodymium trichloride), and allyl derivatives of the metals are preferred. Neodymium compounds are the most preferred. Illustrative neodymium compounds can include neodymium naphthenate, neodymium octanoate, neodymium octoate, neodymium trichloride, neodymium trichloride complexes formed with tetrahydrofuran (e.g., $NdCl_3(THF)_2$) and ethanol (e.g., $(NdCl_3(EtOH)_3)$, neodymium 2,2-diethylhexanoate, neodymium 2-ethylhexoate, neodymium 2-ethyloctoate, neodymium 2,2-diethyl heptanoate, allyl neodymium dichloride, bis-allyl neodymium chloride, and tris-allyl neodymium. Neodymium neodecanoate, neodymium octanoate, neodymium versatare, and p-allyl neodymium dichloride give particularly good results. A mixture of rare earth metal catalysts can be employed. And, one or more rare earth metal catalysts can also be used in combination with at least one transition metal catalyst (including a metallocene catalyst) in a single reactor or in multiple reactors, preferably connected in series.

In general, the rare earth compounds, particularly the neodymium compounds used to prepare the rare earth catalysts described herein, can be obtained as solutions or suspensions in known diluents (aliphatic, aromatic, oxygenated hydrocarbons) containing no or small amounts of water (0.001 to 5%) and/or with an excess of rigand (0.001 to 10 equivalents). Other reagents such as alcohols, carboxylic acids, amines, amides or ethers can be added to solutions or suspensions to maintain the solubility of the rare earth compound. Preferably, the hydrocarbon solutions or suspensions of the rare earth compound (e.g. neodymium compound) will contain 0 to 2500 ppm water and 0.5 to 2 equivalents of free rigand such as, for example, versatic acid. The neodymium compound is typically used as a 1 to 50 wt % solution. These solutions or suspensions, such as, for example, neodymium versatate in hexane (8.9% Nd; 9.3% versatic acid; 150 ppm water, Lot #9534101) used in some of the examples herein can be obtained from Rhone-Poulenc.

A single site catalyst is another preferred catalyst which can be employed alone or in combination with a rare earth metal catalyst and/or transition metal catalyst to make polymers of this invention. One such catalyst is disclosed in U.S. Pat. No. 5,527,752 to Reichle et al. This catalyst comprises complexes of transition metals, substituted or unsubstituted p-bonded ligands and heteroallyl moieties, useful as catalyst precursors in polyolefin polymerizations typically in conjunction with a cocatalyst such as MAO or MMAO.

Rare earth catalyst modifiers and co-catalysts consist of aluminum alkyl halides and trialkyl alumimum compounds as described in WO 96/04323. Preferred co-catalysts that can be employed with the rare earth metal precursor component include triethylaluminum (TEAL), triisobutylaluminum (TIBA), trihexylaluminunm (THAL), methylaluminoxane (MAO), modified methylalnminoxane (MMAO), trimethylaluminum (TMA), a dialkyl aluminum hydride or a mixture of a dialkyl aluminum hydride or a mixture of a dialkyl aluminum hydride and a trialkyl aluminum. When employed, promoters that can be used with rare earth metal compounds include one or more Lewis acids such as BCl3, AlCl3, ethylaluminum dichloride, ethylaluminum sesquichloride, diethylaluminum chloride, and other alkyl radical derivatives. Also, organohalide derivatiives of these compounds such as those ennmerated in WO 96/04323 can be employed.

The conventional Ziegler-Natta catalysts, by which is meant those formed by reacting a metal alkyl or hydride with a transition metal compound, are preferred in the practice of this invention. Those formed by reacting an aluminum alkyl with salts of metals of Groups I to III of the Periodic Table of the Elements are particularly useful.

Illustrative of the catalysts useful in the practice of this invention are the following:

A. Titanium based catalysts such as those described in U.S. Pat. Nos. 4,376,062; 4,379,758.

B. Chromium based catalysts such as those described in U.S. Pat. Nos. 3,709,853; 3,709,954; and 4,077,904.

C. Vanadium based catalysts such as vanadium oxychloride and vanadium acetylacetonate.

D. Metallocene catalysts such as those described in U.S. Pat. Nos. 4,530,914; 4,665,047; 4,752,597; 5,218,071; 5,272,236; 5,278,272; 5,317,036; and 5,527,752.

E. Cationic forms of metal halides.

F. Cobalt catalysts and mixture thereof such as those described in U.S. Pat. Nos. 4,472,559 and 4,182,814.

G. Nickel catalysts and mixtures thereof such as those described in U.S. Pat. Nos. 4,155,880, 4,102,817, PCT 95/09826(US) and PCT 95/09827(US).

The transition metal catalysts employed in the process of this invention can have a metal component, a co-catalyst, and optionally a promoter. The metal component can be a transition metal compound or a mixture of two or more transition metal compounds. In general, the transition metal component of the catalyst can be soluble or insoluble, supported or unsupported, or spray dried in either the presence or absence of a filler. Alternatively, the polymerization catalyst can be introduced to the polymerization zone in the form of a prepolymer using techniques known to those skilled in the art or as described for EPRs and EPDMs.

When the metal component is supported, typical supports can include, for example, silica, carbon black, porous crosslinked polystyrene, porous crosslinked polypropylene, alumina, thoria, zirconia, magnesium halide (e.g., magnesium chloride) support materials, and their mixtures. Silica, carbon black, and alumina are preferred support materials. Silica, carbon black, and mixtures of them are the most preferred support materials. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 Angstroms and preferably at least about 200 Angstroms. Generally, the amount of support used is that which will provide about 0.1 to about 1.0 millimole of transition metal per gram of support. In a preferred embodiment, two types of carbon black are used as support. DARCO G-60 (pH of water extract=5) is used as dry powder having a surface area of 505 square meters per gram, average particle size of 100 microns, and porosity of 1.0 to 1.5 cubic centimeter per gram. NORIT A (pH of water extract=9–11) used as a dry powder has a surface area of 72 0 square meters per gram, average particle size of 45 to 80 microns.

The metal component can be impregnated on a support by well known means such as by dissolving the metal compound in a solvent or diluent such as a hydrocarbon or tetrahydrofuran in the presence of the support material and then removing the solvent or diluent by evaporation such as under reduced pressure. Alternatively, the transition metal component can be dissolved in a solvent or diluent such as a hydrocarbon or tetrahydrofuran and spray dried to generate a well-shaped catalyst precursor having little or no silica or other inorganic solids content, if desired.

The preferred transition metal compounds for making the polymers (e.g., polybutadiene, polyisoprene, polystyrene, and styrene-butadiene rubber) are compounds containing nickel, titanium, and cobalt, with cobalt and nickel compounds being the most preferred. Nickel compounds of the metal component of the catalyst are organonickel compounds of nickel with mono- or bidentate organic ligands containing up to 20 carbon atoms. "Ligand" is defined as an ion or molecule bound to and considered bonded to a metal atom or ion. Mono-dentate means having one position through which covalent or coordinate bonds with the metal may be formed; bidentate means having two positions through which covalent or coordinate bonds with the metal may be formed. The organonickel compounds are generally soluble in inert solvents. Thus, any salt or an organic acid containing from about 1 to 20 carbon atoms may be employed. Representative of organonickel compounds are nickel benzoate, nickel acetate, nickel naphthenate, nickel octanoate, nickel neodecanoate, nickel 2-ethylhexanoate, bis(-π-allyl nickel), bis(cycloocta-1,5-diene), bis(allyl nickel trifluoroacetate), bis(furyl dioxime) nickel, nickel palmitate, nickel stearate, nickel acetylacetonate, nickel salicaldehyde, bis(salicyladehyde) ethylene diimine nickel, bis(cyclopentadiene) nickel, cyclopentadienylnickel nitrosyl and nickel tetracarbonyl. The preferred component containing nickel is a nickel salt of a carboxylic acid or an organic complex compound of nickel.

Co-catalysts that can be employed with the component containing nickel include triethylaluminum (TEAL), triisobutylaluminum (TIBA), diethyl aluminum chloride (DEAC), partially hydrolyzed diethyl aluminum chloride (DEACO), methylaluminoxane (MAO), or modified methylaluminoxane (MMAO).

When MAO or MMAO is employed as the co-catalyst, it may be one of the following: (a) branched or cyclic oligomeric poly(hydrocarbylaluminum oxide)s which contain repeating units of the general formula —(Al(R''')O)—, where R''' is hydrogen, an alkyl radical containing from 1 to about 12 carbon atoms, or an aryl radical such as a substituted or unsubstituted phenyl or naphthyl group; (b) ionic salts of the general formula $[A]^{+1}[BR^*_4]^{-1}$, where A+ is a cationic Lewis or Bronsted acid capable of abstracting an alkyl, halogen, or hydrogen from the transition metal component of the catalyst, B is boron, and R* is a substituted aromatic hydrocarbon, preferably a perfluorophenyl radical; and (c) boron alkyls of the general formula BR*$_3$, where R* is as defined above.

Aluminoxanes are well known in the art and comprise oligomeric linear alkyl aluminoxanes represented by the formula:

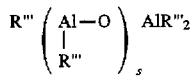

and oligomeric cyclic alkyl aluminoxanes of the formula:

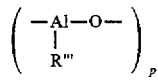

wherein s is 1 to 40, preferably 10 to 20; p is 3 to 40, preferably 3 to 20; and R''' is an alkyl group containing 1 to 12 carbon atoms, preferably methyl or an aryl radical such as a substituted or unsubstituted phenyl or naphthyl radical. Modified methylaluminoxane is formed by substituting 20-80 wt % of the methyl groups with a $C_2$ to $C_{12}$ group, preferably with isobutyl groups, using techniques known to those skilled in the art.

Promoters that can be used with the component containing nickel include hydrogen fluoride (HF), borontrifluoride ($BF_3$), or an etherate of HF and/or $BF_3$.

The titanium compound (titanares) can be $TiCl_4$, $TiBr_4$, $TiI_4$ or $Ti(OR)_4$ wherein R is an alkyl radical.

Co-catalysts that can be employed with the component containing titanium include TEAL, TIBA, dialkylaluminum iodide, and MAO.

Promoters that can be used with the component containing titanium include iodine and organic etherares. For isoprene, the combination $TiCl_4$, TIBA, and DPE (diphenyl ether) is employed.

The cobalt compound can be any organic compound such as the cobalt salts of organic acids, cobalt complexes and the like. Preferably, the cobalt compound is selected from the group consisting of cobalt β-ketone complexes, for example, cobalt (II) acetylacetonate and cobalt (III) acetylacetonate; cobalt β-ketoacid ester complexes, for example, cobalt acetylacetonate ethylester complexes; cobalt salts of organic carboxylic acids having 6 or more carbon atoms, for example, cobalt octoate, cobalt naphthenate, and cobalt benzoate; and cobalt halide complexes, for example, cobalt chloride-pyridine complexes; cobalt-chloride-phosphine complexes; cobalt-chloride-ethyl alcohol complexes and cobalt complexes coordinated with butadiene, for example, (1,3-butadiene) [1-(2-methyl-3-butenyl)-π-allyl]-cobalt which may be prepared, for example, by mixing a cobalt compound with an organic aluminum compound, organic lithium compound or alkyl magnesium compound and 1,3-butadiene. Other typical cobalt compounds are cobalt sorbate, cobalt adipate, cobalt 2-ethylhexoate, cobalt stearate, and the like compounds wherein the organic portion of the molecule contains about 5 to 20, preferably 8 to 18 carbon atoms and one or two carboxylic functions, as well as acetylacetonate.

Co-catalysts that can be employed with the component containing cobalt include ethylaluminum sesquichloride (EASC), ethylaluminum dichloride (EADC), DEACO, MAO and mixtures thereof.

Water in small amounts can be used as a promoter with the metal component containing cobalt, if desired.

Inert Particulate Material. Fluidization aids employed in the polymerization processes can be inert particulate materials which are chemically inert to the reaction. Examples of such fluidization aids or flow aids include carbon black, silica, clays and other like materials such as talc. Organic polymeric materials can also be employed as a fluidization aid. Carbon blacks and silicas and their mixture are the preferred fluidization aids with carbon black being the most preferred. The carbon black materials employed have a primary particle size of about 10 to 100 nanometers and an average size of aggregate (primary structure) of about 0.1 to about 10 microns. The specific surface area of the carbon black is about 30 to 1,500 $m^2$/gm and the carbon black displays a dibutylphthalate (DBP) absorption of about 80 to about 350 cc/100 grams.

Silicas which can be employed are amorphous and have a primary particle size of about 5 to 50 nanometers and an average size of aggregate about 0.1 to 10 microns. The average size of agglomerates of silica is about 2 to about 120 microns. The silicas employed have a specific surface area of about 10 to 500 $m^2$/gm and a dibutylphthalate (DBP) absorption of about 100 to 400 cc/100 grams.

Clays and talc which can be employed according to the invention have an average particle size of about 0.01 to about 10 microns and a specific surface area of about 3 to 30 $m^2$/gm. They exhibit oil absorption of about 20 to about 100 gms per 100 gms.

Organic polymeric substances which can be used include polymers and copolymers of ethylene, propylene, butene, and other alpha olefins and polystyrene, in granular or powder form. These organic polymeric materials have an average particle size ranging from about 0.01 to 100 microns, preferably 0.01 to 10 microns.

In general, the mount of fluidization aid utilized generally depends on the type of material utilized and the type of polybutadiene or polyisoprene produced. When utilizing carbon black or silica as the fluidization aid, they can be employed in amounts of about 0.3% to about 80% by weight, preferably about 5% to about 60%, and most preferably about 10% to about 45%, based on the weight of the final product (polybutadiene or polyisoprene or styrene polymer) produced. When clays or talcs are employed as the fluidization aid, the amount can range from about 0.3% to about 80% based on the weight of the final product, preferably about 12% to 75% by weight. Organic polymeric materials are used in mounts of about 0.1% to about 50% by weight, preferably about 0.1% to about 10% based on the weight of the final polymer product produced.

The fluidization aid can be introduced into the reactor at or near the top of the reactor, at the bottom of the reactor, or to the recycle line directed into the bottom of the reactor. Preferably, the fluidization aid is introduced at or near the top of the reactor or above the fluidized bed. It is preferred to treat the fluidization aid prior to entry into the reactor to remove traces of moisture and oxygen. This can be accomplished by purging the material with nitrogen gas and heating by conventional procedures. The fluidization aid can be added separately or combined with one or more butadiene monomers, or with a soluble unsupported catalyst. Preferably, the fluidization aid is added separately.

Other Additives. Conventional techniques for the prevention of fouling of the reactor and polymer agglomeration can be used in the practice of our invention. Illustrative of these techniques are addition of negative charge generating chemicals to balance positive charge generating chemicals or by addition of positive charge generating chemicals to neutralize negative Voltage potentials as described in U.S. Pat. No. 4,803,251. Antistat substances may also be added continuously or intermittently directly to the reactor or into the recycle lines to prevent or neutralize static charge generation. Other additive which can be employed include chain transfer agents, scavenging agents, and the like.

Preferably, the polymerizations of the invention are carried out in the gas phase, preferably in a fluidized bed made up of, or containing a "seed bed" of polymer such as particulate polybutadiene, polyisoprene, polystyrene, styrene-butadiene rubber, or mixtures thereof. The bed is usually made up of the same granular resin that is to be produced in the reactor. Accordingly, using a seed bed of starting material (particulate polymer) which is the same or substantially the same as the polymer to be produced is preferred. Typically, a seed bed (having a moisture content of 20 to 600 ppm) from a previous run, optionally also containing inert particulate material (fluidization aid), is employed. This bed is can be dried to 300 to 400 ppm or less and optionally passivated with an aluminum alkyl (e.g., co-catalyst) before commencing a polymerization. Thus, during the course of the polymerization, the bed comprises formed polymer particles, growing polymer particles, and catalyst particles fluidized by polymerizing and modifying gaseous components introduced at a flow rate or velocity sufficient to cause the particles to separate and act as a fluid.

The fluidizing gas is made up of the initial feed, make-up feed, and cycle (recycle) gas, i.e., one or more dienes or vinyl-substituted aromatic compounds and, optionally, other monomers (e.g., alpha olefins having 2–18 carbon atoms) and, if desired, modifiers and/or an inert carrier gas (nitrogen, argon, hydrocarbons, e.g. ethane). A typical cycle gas is comprised of one or more dienes optional monomers when present, nitrogen, and hydrogen, either alone or in combination. The process can be carried out in a batch or continuous mode, the latter being preferred. The essential parts of the reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of one or more cycle gas compressors from upstream to downstream of the cooler and another involves the addition of a vent line from the top of the product discharge vessel (stirred product tank) back to the top of the reactor to improve the fill level of the product discharge vessel.

In terms of the fluidized bed, a superficial gas velocity of about 1 to about 4.5 feet per second and preferably about 1.5 to about 3.5 feet per second can be used. The total reactor pressure can be in the range of about 150 to about 600 psia and is preferably in the range of about 250 to about 500 psia. The diene or vinyl-substituted aromatic compound partial pressure can be in the range of about 25 psi to about 350 psi and is preferably in the range of about 60 psi to about 250 psi. The polymerizations of the invention are performed above the softening temperature of the polymer being produced, i.e., about 20° C. to about 70° C. Feed streams of liquid diene and/or aromatic compound and hydrogen (or other chain transfer agent) are preferably fed to the reactor recycle line or directly to the fluidized bed reactor, or both, to enhance mixing and dispersion. The composition of polymer product can be varied by changing the diene and/or vinyl-substituted aromatic compound molar ratio in the gas phase and the diene/aromatic compound concentration in the fluidized bed. The product is intermittently discharged from the reactor as the bed level builds up with polymer. The production rate is controlled by adjusting the catalyst feed rate.

Kill Agent. A kill agent selected from the group consisting of an alcohol having 1 to 20 carbon atoms, an alkyl or cycloalkyl monoether having 2 to 20 carbon atoms, ammonia, water, an alkyl or aryl amine, and mixtures thereof in an amount effect to terminate the polymerization is introduced to the reactor to terminate the polymerization. When employed, the alkyl amine can be a mono-, di- or tri-substituted amine in which each alkyl group can independently have 1 to 20 carbon atoms, preferably 1 to 10 carbon atoms, most preferably 1 to 4 carbon atoms. The aryl amine used can have 6 to 24 carbon atoms, preferably 6 to 14 carbon atoms. Preferred amines are butyl amine and aniline. Preferably, the kill agent is selected from the group consisting of tetrahydrofuran, ammonia, water, methanol, ethanol, and mixtures thereof. Of these, gaseous ammonia is most preferred. In any event, it is preferred to use a kill agent which will allow the polymerization to be restarted. The kill agent can be added directly to the reactor, preferably into a reactor zone where the dispersion of the agent is fast, for example, under the fluidization grid. It can be added into the recycle lines downstream of one or more compressors, preferably at a point situated as close as possible to the return to the polymerization reactor, or added in one or more of the monomer streams.

The kill agent is introduced into the reactor over a relatively short period of time, typically less than 5 minutes. The period of introduction of the kill agent is advantageously as short as possible and is preferably shorter than one minute and more preferably shorter than 30 seconds. Furthermore, it is also desirable to discontinue the feeding of monomer (e.g., butadiene, isoprene, and or styrene) to the polymerization reactor. Under these conditions, a stoppage of the polymerization reaction is observed quickly, generally in less than 10 minutes and in many cases in less than 5 minutes after the end of the introduction of the kill agent into the polymerization reactor.

The kill agent is introduced into the polymerization reactor in a quantity which is sufficient to substantially terminate the polymerization or to deactivate substantially all the catalyst present in the polymerization reactor and thus to stop the polymerization reaction. In practice, the quantity of agent introduced in the reactor is from i to 10 times and preferably from I to 3 times the minimum quantity necessary for stopping the polymerization. This minimum quantity can be obtained by previous experimentation performed in a reactor working with known quantities of catalyst and kill agent. For this purpose the agent is preferably introduced into the polymerization reactor in a quantity such that in the reactor the mole ratio of kill agent to cocatalyst is at least 0.05 to 5:1. The use of a quantity of kill agent which is too small would have little or no effect on the catalyst and it would be difficult to observe a stoppage of the polymerization reaction. There is no upper limit of the quantity of agent to be used. However, the quantity of kill agent is often such that in the reactor the mole ratio of kill agent to cocatalyst is 0.1 to 2:1, most preferably 0.5 to 1 (kill agent):1 (cocatalyst). The polymerizations can be restarted by the adding more diene and/or vinyl-substituted aromatic compound, catalyst and/or cocatalyst, or adding all of these components to the reactor. Generally, in order to restart the polymerization, it is only necessary to add additional cocatalyst.

All patents mentioned in this application are hereby incorporated by reference.

EXAMPLES

The following examples are provided to illustrate the invention.

Catalyst Systems: The catalysts are fed to the gas phase reactor either in solution or supported on silica or carbon black. The catalysts can be activated before or after addition or can be added as pre polymerized catalysts as well. The following catalysts and cocatalysts were used in the reaction termination experiments:

A. Silica supported neodymium neodecanoate (Nd (neodec)$_3$) treated with 1.5 equivalents of diethyl aluminum chloride (DEAC): Nd(neodec)$_3$-1.5 DEAC/SiO2, with tri-iso-butyl aluminum (TIBA) or di-iso-butyl aluminum hydride (DIBAH) as cocatalysts.

B. Silica supported neodymium versarate (Nd(ver)$_3$) treated with 4.5 equivalents of diethyl aluminum chloride (DEAC): Nd(Neodec)$_3$-4.5 DEAC/SiO2, with TIBA or DIBAH as cocatalysts.

C. Toluene solution bis - allyl - neodymium chloride - methyl aluminoxane complex: bis-p-allyl-NdCl/MAO.

D. Silica supported cobalt octoate: Co(oct)$_2$/SiO$_2$, in conjunction with partially hydrolized diethylaluminum chloride (DEACO) in toluene solution as cocatalyst.

E. Silica supported cobalt tri-acetylacetonate: Co(acac)$_3$/SiO$_2$, in conjunction with ethylaluminum sesquichloride (EASC) as cocatalyst.

F. Toluene solution nickel octoate (Ni(oct)$_2$)-triethylaluminum (TEAL) - boron trifluoride - etherate complex: Ni(oct)$_2$/TEAL/BF$_3$.OEt$_2$, pre-polymerized with 1,3-butadiene.

1,3-Butadiene Polymerization Procedure: The polymerization of 1,3-butadiene (BD) was carried out in gas phase according to the following procedure: The one liter stirred autoclave was charged with 32 gram of dry carbon black N-650 used as fluidization aid. Alternatively, 200 g of dehydrated salt (NaCl) mixed with 2 g of carbon black was used as bed in the reactor. The reactor was dried with a flow purge of N$_2$ at 90°–100° C. Once the internal reactor temperature was adjusted to 50° C., aluminum alkyl (the same aluminum alkyl to be used as cocatalyst) was added to passivate the reactor. A measured amount of the catalyst was charged to the stirred reactor. The reactor was pressure purged with butadiene and the reactor was then pressurized with 22 psig of monomer. The cocatalyst was injected to start the polymerization. The monomer was continuously flowing to maintain the the initial reactor pressure during the reaction time. The reaction was terminated by injection of a stabilizer package dissolved in alcohol. The weight of the black polymer corrected by ash content was used to determine the yield.

BD Polymerization Termination Experiments: Gas phase BD polymerizations were performed at 50° C. and 60° C., at a monomer pressure of 35–37 psia, using a bed of mixed salt and carbon black in some experiments and only carbon in other experiments. BD flow was used to measure the catalyst activity, and the effect of the addition of a given inhibitor to an ongoing polymerization was reflected in decay of the BD flow. In all cases the selected terminating agent was introduced into the reactor when the reaction displayed high catalytic activity (high BD flow). The operating conditions with the different terminating agents are presented below. Reviving reaction attempts were done by addition of more cocatalyst and/or catalyst.

Examples 1, 2 and 3: show that CO is not an effective terminating reaction agent for neodymium, nickel and cobalt catalysts.

Examples 4 through 10: show the effectiveness of kill reagents with various catalysts.

| Example No. | Catalyst Type | Catalyst mmole | Cocatalyst Type mmole | Kill Agent Type Mole Ratio | Reviving Treatment Mole Ratio | Comments |
|---|---|---|---|---|---|---|
| 1 | A | 0.103 | TIBA 3.5 | CO/TIBA = 4 | None | CO does not kill reaction |
| 2 | D | 0.060 | DEACO 3.4 | CO/Co = 11 | None | CO does not kill reaction |
| 3 | F | 0.048 | TEAL + BF$_3$ 1.94 | CO/Ni = 10 | None | CO does not kill reaction |
| 4 | A | 0.103 | TIBA 0.35 | EtOH/TIBA = 1 | TIBA/EtOH = 1.5 | EtOH kills reaction irreversibly |
| 5 | A | 0.103 | TIBA 0.35 | THF/TIBA = 0.5 | TIBA/THF = 1.5 | THF kills reaction irreversibly |
| 6 | B | 0.050 | TIBA 3.5 | NH$_3$/Al = 0.5 | TIBA/NH3 = 7 Reactor vented/ purged 0.05 mmole Nd added. | Low activity recovery. Full activity recovery |
| 7 | B | 0.050 | TIBA 3.5 | NH$_3$/Al = 0.5 | 1.5 mmole DIBAH Reactor vented/ purged 0.05 mmole Nd added | No activity recovery Full activity recovery |
| 8 | C | 0.030 | MAO + DIBAH = 4 | NH$_3$/Al = 1.7 | DIBAH/NH$_3$ = 2.4 Reactor vented/ purged 0.05 mmole Nd added | NH3 kills reaction. 40% activity recovery. |
| 9 | E | 0.030 | EASC 3.0 | NH$_3$/EASC = 1 | 3 mmole EASC Reactor vented/purged 0.03 mmole Co added | No activity recovery. Full activity recovery. |
| 10 | F | 0.024 | TEAL + BF$_3$.OEt$_2$ = 0.96 | NH$_3$/(Ni(oct)$_2$ + TEAl + BF$_3$) = 7 | Reactor vented/ purged 0.024 mmole Ni added | NH3 kills reaction No activity recovery. |

Example 11 (Fluidized Bed). In accordance with the process of the invention, a fluidized bed reaction system as described above, was operated as described below to produce polybutadiene. The polymer was produced under the following reaction conditions: 30° C. reactor temperature and 100 psia reactor pressure. The volume of the reactor was 55 ft$_3$; the resin's weight inside the reactor was 112 lbs. The catalyst system employed was cobalt(acetylacetonate)$_3$ with partially hydrolyzed diethylaluminum chloride (DEACO) as co-catalyst. The production rate was 20 lb/h. The product had a Mooney value of 55. Carbon black is fed as the flow aid, at a rate equal to 5 to 50 PHR of polymer.

Examples 12-16 (Fluidized Bed). The following examples set forth in tabular form, operating conditions for producing polymers in accordance with the invention. They illustrate the practice of the invention using different catalyst systems and differing cycle gas compositions.

|  | EXAMPLE NO. | | |
|---|---|---|---|
|  | 11 | 12 | 13 |
|  |  | PRODUCT: |  |
|  | POLY-BUTADIENE | POLY-BUTADIENE | POLY-BUTADIENE |
| Reaction Conditions: |  |  |  |
| Temperature (°C.) | 30 | 50 | 60 |
| Pressure (psi) | 100 | 110 | 100 |
| Superficial Velocity (ft/s) | 1.75 | 2.0 | 1.5 |
| Production Rate (lb/h) | 20 | 25 | 20 |
| Total Reactor Volume (ft$^3$) | 55 | 55 | 55 |
| Reaction Zone Volume (ft$^3$) | 7.5 | 7.5 | 7.5 |
| Bed Height (ft) | 7.0 | 7.0 | 7.0 |
| Bed Diameter (ft) | 1.17 | 1.17 | 1.17 |
| Bed Weight (lbs) | 112 | 112 | 112 |
| Cycle Gas Composition: |  |  |  |
| N$_2$ | 80 | 50 | 40 |
| Butadiene | 20 | 50 | 60 |
| Styrene | — | — | — |
| Catalyst: | Co(acac)$_3$* | Nd(ver)$_3$-DEAC/silica | Nd(ver)$_3$-DEAC/silica |
| Co-catalyst: | DEACO | DIBAH | DIBAH |
| Gas Phase Kill Reagent: | NH3 | NH3 | EtOH |
| Molar Ratio/cocatalyst | 1 | 0.5 | 1 |
| Polymer Composition: |  |  |  |
| Butadiene | 100 | 100 | 100 |
| Styrene | — | — | — |

|  | EXAMPLE NO. | | |
|---|---|---|---|
|  | 14 | 15 | 16 |
|  |  | PRODUCT: |  |
|  | SBR | POLY-BUTADIENE | POLY-STYRENE |
| Reaction Conditions: |  |  |  |
| Temperature (°C.) | 40 | 50 | 40 |
| Pressure (psi) | 110 | 100 | 100 |
| Superficial Velocity (ft/s) | 2.0 | 1.75 | 1.5 |
| Production Rate (lb/h) | 25 | 20 | 40 |
| Total Reactor Volume (ft$^3$) | 55 | 55 | 55 |
| Reaction Zone Volume (ft$^3$) | 7.5 | 7.5 | 7.5 |
| Bed Height (ft) | 7.0 | 7.0 | 7.0 |
| Bed Diameter (ft) | 1.17 | 1.17 | 1.17 |
| Bed Weight (lbs) | 112 | 112 | 112 |
| Cycle Gas Composition: |  |  |  |
| N$_2$ | 27.3 | 60 | 99.7 |
| Butadiene | 72.5 | 40 | — |
| Styrene | .2 | — | 0.3 |
| Catalyst: | — | Nickel | Cp$_2$ZrMe$_2$** |
| Co-catalyst: | CpTiCl$_3$ | TIBA | MAO*** |
| Promoter |  | HF(Obu)$_2$ |  |
| Gas Phase Kill Reagent: | MAO | THF | NH$_3$ |
| Molar Ratio/cocatalyst | NH3 0.5 | 1 | 0.5 |
| Polymer Composition: | — |  |  |
| Butadiene |  | 100 | — |
| Styrene | 75 25 | — | 100 |

*Cobalttriacetylacetonate
**Dicyclopentadienylzirconiumdimethyl
***Methylalumoxane

What is claimed is:

1. A method for terminating a gas phase polymerization of a compound selected from the group consisting of a conjugated diene, a vinyl-substituted aromatic compound, and mixtures thereof, in a polymerization vessel in the presence of a catalyst, and optionally in the presence of an inert particulate material, comprising introducing a kill agent selected from the group consisting of an alcohol having 1 to 20 carbon atoms, an alkyl or cycloalkyl monoether each having 2 to 20 carbon atoms, ammonia, water, an alkyl or aryl amine, and mixtures thereof into the vessel in an amount sufficient to terminate polymerization;

and wherein the catalyst has a metal component in which the metal is selected from the group consisting of a rare earth, nickel, cobalt, titanium, and mixtures thereof.

2. The method of claim 1 wherein the polymerization is conducted in the gas phase above the softening temperature of the polymer being produced in the presence of an inert particulate material selected from the group consisting of carbon black, silica, clay, talc, alumina and mixtures thereof.

3. The method of claim 1 wherein the polymerization is conducted in condensed mode or liquid monomer mode.

4. The process of claim 3 wherein the compound being polymerized is butadiene, isoprene, styrene, and mixtures thereof.

5. The method of claim 4 wherein the mole ratio of kill agent to cocatalyst ranges from about 0.05 to 5:1.

6. The method of claim 5 wherein the kill agent is selected from the group consisting of an alcohol having 1 to 10 carbon atoms, tetrahydrofuran, ammonia, and water.

7. A method of claim 2 wherein the compound being polymerized is selected from the group consisting of a butadiene, isoprene, styrene, and mixtures thereof; the catalyst contains a neodymium, nickel or cobalt compound precursor; the inert particulate material is carbon black, silica or a mixture thereof; and the kill agent is ammonia or an alcohol having 1 to 4 carbon atoms.

8. The method of claim 7 wherein the gas phase polymerization is conducted in the liquid monomer mode.

9. The method of claim 1 wherein the polymerization is restarted by the addition of cocatalyst.

* * * * *